(12) United States Patent
Benimeli

(10) Patent No.: US 6,667,621 B1
(45) Date of Patent: Dec. 23, 2003

(54) METHOD AND APPARATUS FOR DETERMINING THE RESISTIVITY OF A FORMATION SURROUNDING A CASED WELL

(75) Inventor: Dominique Benimeli, Châtillon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 166 days.

(21) Appl. No.: 09/979,876

(22) PCT Filed: Jun. 7, 2000

(86) PCT No.: PCT/EP00/05298
§ 371 (c)(1),
(2), (4) Date: Feb. 11, 2002

(87) PCT Pub. No.: WO00/79307
PCT Pub. Date: Dec. 28, 2000

(30) Foreign Application Priority Data

Jun. 22, 1999 (FR) .............................. 99 07913

(51) Int. Cl.$^7$ .............................. G01V 3/02; G01V 3/04
(52) U.S. Cl. ..................... 324/368; 324/347; 324/373
(58) Field of Search ................... 324/368, 347, 324/369, 370, 371, 372, 373, 375, 716; 702/3, 7

(56) References Cited

U.S. PATENT DOCUMENTS 5,570,024 A * 10/1996 Vail, III ................. 324/368
6,545,477 B1 * 4/2003 Beguin et al. ............ 324/368

* cited by examiner

Primary Examiner—Jay Patidar
Assistant Examiner—Subhavar Zaveri
(74) Attorney, Agent, or Firm—Martin Hyden; Helene Rayboud

(57) ABSTRACT

The invention relates to a method and apparatus for studying the resistivity of a geological formation around a borehole fitted with metal casing. An electric current is applied to the casing so as to cause current to leak into said formation at a given level, and said current is shunted by a feedback circuit in contact with the casing on either side of the measurement level, said circuit being organized to ensure that the current flowing along the casing at said level is less compared with the shunt current, the difference between the voltage drops on the adjacent sections of casing situated on either side of the measurement level is determined, and the leakage current (Ifor) is deduced therefrom.

9 Claims, 2 Drawing Sheets

METHOD AND APPARATUS FOR DETERMINING THE RESISTIVITY OF A FORMATION SURROUNDING A CASED WELL

The present invention relates to determining the resistivity of geological formations surrounding a well that is provided with a metal casing.

The importance of resistivity logs in oil prospecting is well known. It is known that the resistivity of a formation depends essentially on the fluid it contains. A formation containing salt water, which is conductive, has resistivity that is much lower than a formation filled with hydrocarbons, and consequently resistivity measurements are of irreplaceable value for locating hydrocarbon deposits. Resistivity logs have been made very widely and for a long time, particularly by means of devices having electrodes, however existing techniques have a field of application which is limited to wells that are not cased (known as "open holes" in oil industry terminology). The presence of metal casing in a well, where the resistivity of metal is tiny compared with values that are typical for geological formations (about $2 \times 10^{-7}$ ohm.m for steel casing compared with 1 to 100 ohm.cm for a formation), represents a considerable barrier to sending electrical currents into the formation surrounding the casing. As a result, it is essential for resistivity measurements to be performed before the casing is put into place. In particular, resistivity measurements cannot be obtained from wells that are in production since they are fitted with casing.

It would therefore be most advantageous to be able to measure resistivity in cased sections of wells. Such measurement, performed in a well that is in production and at the level of the deposit, would make it possible to locate the water-hydrocarbon interfaces, and thus to track the positions of such interfaces over time, in order to monitor the behavior of the hydrocarbon deposit and optimize exploitation thereof. It would also be possible to obtain resistivity measurements in a well (or a section of well) where no measurements were performed prior to the casing being put into place, in particular to improve knowledge about the deposit, and perhaps find productive layers that were not located initially.

Proposals on this topic are to be found in the literature. The principle on which such measurements are based, described in U.S. Pat. No. 2,459,196, consists in causing a current to flow along the casing under conditions in which current leaks out or is lost to the formation. This loss is a function of the resistivity of the formation, the more conductive the formation the greater the loss, thus by measuring the loss it is possible to determine the resistivity of the formation. According to the above-mentioned patent, current loss is evaluated by establishing a profile for the current flowing along the casing. U.S. Pat. No. 2,729,784 describes a measurement method that uses three measurement electrodes spaced apart along the casing and forming pairs of adjacent electrodes that are theoretically identical. Current electrodes are placed on either side on the measurement electrodes to inject currents in opposite directions into the casing. A feedback loop servo-controls current injection so as to put the outer measurement electrodes at the same potential for the purpose of eliminating the effect of differences in the resistance of the casing in the sections defined by the measurement electrodes. A value for the leakage current at the middle electrode is obtained by measuring the voltage drop in each of the pairs of electrodes and by taking the difference between the voltage drops, said difference being stated to be proportional to the leakage current. U.S. Pat. No. 2,891,215 describes a method of the same type using an additional current electrode level with the middle measurement electrode, and disposed so as to apply a current which exactly compensates the leakage current.

As in U.S. Pat. No. 2,729,784, French patent 2 207 278 provides for the use of three regularly-spaced measurement electrodes to measure current leakage, and it describes a two-stage method: a first stage for measuring the resistance of the section of casing defined by the measurement electrodes, during which stage the current is caused to flow along the casing so that there is no leakage into the formation; and a second stage during which a current leak can take place into the formation. To this end, a current injection system is provided that comprises an emitter electrode and two return electrodes, one close to the measurement electrodes and active during the first stage, and the other situated on the surface, and active during the second stage.

U.S. Pat. No. 4,796,186 describes a two-stage method of the same type as above-mentioned French patent 2 207 278, and it uses the same disposition of electrodes. It provides a circuit for eliminating the effect of variations in resistance between the two sections of casing, which circuit comprises amplifiers connected to each pair of measurement electrodes so as to deliver respective output voltage drops. One of the amplifiers has variable gain, and its gain is adjusted during the first stage so as to cancel the difference between the outputs from the amplifiers. That technique is very difficult to implement, given the orders of magnitude specified above. It also requires two distinct measurement stages.

The invention seeks to enable leakage current to be determined in a manner that is simpler and more effective than in the known techniques.

The invention provides a method of studying the resistivity of a geological formation around a borehole fitted with metal casing, the method being characterized by the fact that an electric current is applied to the casing so as to cause current to leak into the formation at a given level, said current is shunted by a feedback circuit in contact with the casing on either side of the measurement level, said feedback circuit being organized so that the current flowing along the casing at said level is small compared with the shunt current, the difference between the voltage drops on adjacent sections of casing situated on either side of the measurement level is determined, and the leakage current is deduced therefrom.

The invention will be well understood on reading the following description given with reference to the accompanying drawings. In the drawings:

FIG. 1 recalls the principle of measuring resistivity from a cased well, using the conventional technique;

The principle on which resistivity is measured from a cased well consists in causing a current to flow along the casing with a remote return so as to enable current to leak into the geological formations around the well, and so as to evaluate the leakage current: at a given level, the more conductive the formation surrounding the well at that level, the greater the leakage current. This can be expressed in mathematical terms by an exponentially decreasing relationship for the current flowing in the casing, with a rate of decrease, at a given level, that is a function of the ratio between the resistivity of the formation Rt and the resistivity of the casing Rc.

Figure 1:
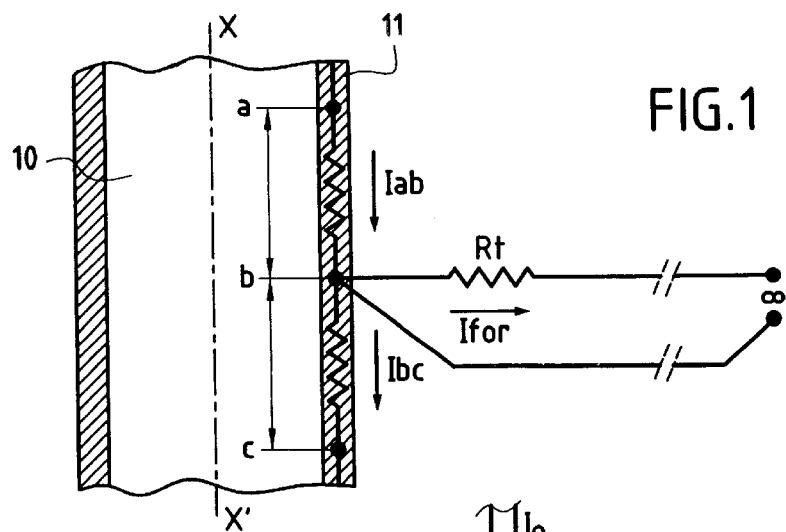

The diagram of FIG. 1 shows a section of a well 10 of axis X–X' fitted with metal casing 11. The level (or depth) at which it is desired to obtain a measurement is referenced B. We consider a section of casing AC extending on either side of level B. If a current flows in the casing with a remote return (e.g. at the surface), current loss into the formation can be represented, in electric circuit terms, by a shunt resistor placed between the level B of the casing and infinity. The resistance of this resistor is representative of the resistivity Rt of the formation at level B. Using Ohm's law, it is thus possible to write:

$$Rt = k(V_{B,\infty}/Ifor) \qquad [1]$$

where k is a geometrical constant which can be determined by calibration measurements, $V_{B,\infty}$ is the potential of the casing at level B relative to infinity, and Ifor is the leakage current at level B.

The loss of current at level B can be described as a difference between current entering level B and current leaving it. Making the approximation that the current varies discretely, it can be assumed that the current in the section AB, and the current in the section BC are both constant, with these currents being taken to be equal to respective mean currents $I_{AB}$ and $I_{BC}$ in those sections, and the leakage current Ifor is determined as the difference between the currents $I_{AB}$ and $I_{BC}$:

$$Ifor = I_{AB} - I_{BC} \qquad [2]$$

Since $I_{AB}$ and $I_{BC}$ are mean values over the sections AB and BC:

$$Ifor = V_{AB}/R_{AB} - V_{BC}/R_{BC} \qquad [2']$$

where $V_{AB}$ and $V_{BC}$ are the potential drops respectively along the sections AB and BC of casing, and where $R_{AB}$ and $R_{BC}$ are the respective resistances of the sections AB and BC of the casing.

Figure 2:
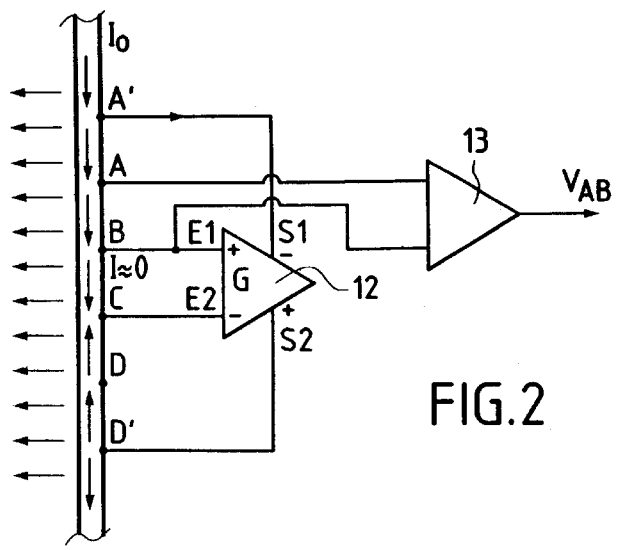
FIG. 2 is a diagram illustrating a first implementation of the method of the invention.

FIG. 2 is a diagram showing an implementation of the invention.

In FIG. 2, there can be seen the borehole 10 and the casing 11 to which a current $I_0$ is applied by an injection electrode (not shown) with the return being remote so that current leaks into the formation, as represented by the parallel arrows.

In FIG. 2, there can be seen axially spaced-apart levels A, B, C, and D on the casing 11, defining sections AB, BC, and CD. Electrodes are placed in contact with the casing at levels B and C, and also at at least one of the levels A and D. These electrodes situated at levels A, B, C, and D are designated respectively by a, b, c, and d. The middle electrodes b and c are connected respectively to inputs E1 and E2 of an amplifier 12 having high gain G. The amplifier 12 is connected in parallel with the circuit formed by the casing 11, the outputs S1 and S2 of the amplifier 12 being connected to the casing 11 at respective levels A' and D' situated beyond the respective ends of the section extending between levels A and D. The amplifier 12 constitutes a feedback loop organized to reduce the potential difference between the inputs E1 and E2 to a value that is substantially zero, or in any event small. The voltage drop between electrodes b and c, and thus the current $I_{BC}$ which flows between these electrodes can then be considered as being substantially zero, or in any case small. Substantially all of the current is thus diverted to the shunt circuit including the amplifier 12. Under such conditions, the current flowing along the casing outside the section BC under the control of the amplifier 12 is substantially equal to the current Ifor which leaks into the formation. The potential difference $V_{AB}$ between the electrodes a and b (or the potential difference $V_{CD}$ between the electrodes c and d) is then substantially proportional to the leakage current Ifor:

$$Ifor \approx V_{AB}/R_{AB} (\text{or } Ifor \approx V_{CD}/R_{CD}) \qquad [3]$$

This potential difference is measured by an amplifier 13 whose inputs are connected to the electrodes a and b (or the electrodes c and d) and whose output voltage is the difference between the input voltages.

The technique of the invention eliminates in simple manner substantially all of the difficulties associated with uncertainty concerning the resistances $R_{AB}$ and $R_{BC}$ of the sections of casing. It results from equations [3] above that uncertainty $\Delta R$ concerning the resistance of the section of casing $R_{AB}$ (or $R_{CD}$) has an effect on uncertainty concerning the leakage current only in the form of a relative term $\Delta R/R$ which is typically of the order of $10^{-2}$ under real conditions. The influence of the uncertainty $\Delta R$ is thus reduced in decisive manner. In addition, the invention makes it possible to obtain the leakage current in a single measurement stage, which is advantageous operationally speaking.

It is stated above that the current $I_{BC}$ flowing in the section BC must be substantially zero or in any event small. In the invention, it is appropriate to set the gain of the amplifier 12 in such a manner that the ratio of the current flowing between levels A' and D' and the current diverted to the amplifier is no greater than about $10^{-2}$, given that the exact ratio varies depending on conditions and measurement context, for example within a given borehole, it varies with the depth at which the measurement is taken, and therefore it cannot be fixed a priori. The above-mentioned order of magnitude suffices firstly to obtain a result that is acceptable from the point of view of reducing the influence of the uncertainty $\Delta R$, and secondly it does not require the gain of the amplifier 12 to be excessively large. Defining suitable characteristics for the amplifier 12 is within the competence of the person skilled in the art.

With values of this order, the current $I_{BC}$ and thus the voltage $V_{BC}$ need not necessarily be completely negligible, and to obtain better accuracy it is preferable to use the voltage $V_{BC}$ obtained at the output of the amplifier 12 in order to determine the leakage current Ifor, in application of above equation [2']. Nevertheless, the approximate method of determination based on equation [3], which does not make use of the voltage $V_{BC}$ also comes within the ambit of the invention.

The circuit described above has an amplifier 12 which serves both as a feedback circuit and as a circuit for measuring the voltage $V_{BC}$.

A variant implementation of that circuit consists in separating these functions by providing a first amplifier for feedback purposes and a second amplifier for measuring $V_{BC}$. The feedback circuit comprising the first amplifier can then be in contact with the casing at points that are other than the points B and C, e.g. points A and D. This variant thus provides greater flexibility.

Furthermore, according to equations [3] or [2'], measuring the leakage current requires knowledge of the resistance of the section of casing over which voltage drop is measured. Given the above observation, the resistances in question do not need to be known very accurately. This opens up various possibilities.

A first possibility consists merely in calculating these resistances as a function of available data concerning the casing at the level under consideration (inside diameter, outside diameter, resistivity) together with other parameters involved (the distances AB, BC, CD, and temperature. at the level under consideration).

Another possibility consists in determining the resistances under consideration by a measuring stage that is distinct from the main operation as described above. A current is caused to flow in the sections of casing AB, BC, and CD so that there is no leakage into the formation, with this being done by a circuit comprising an injection electrode and a return electrode in contact with the casing at levels that are close to the levels A and D respectively, and the voltage drops over the sections of casing under consideration are measured.

Figure 3:
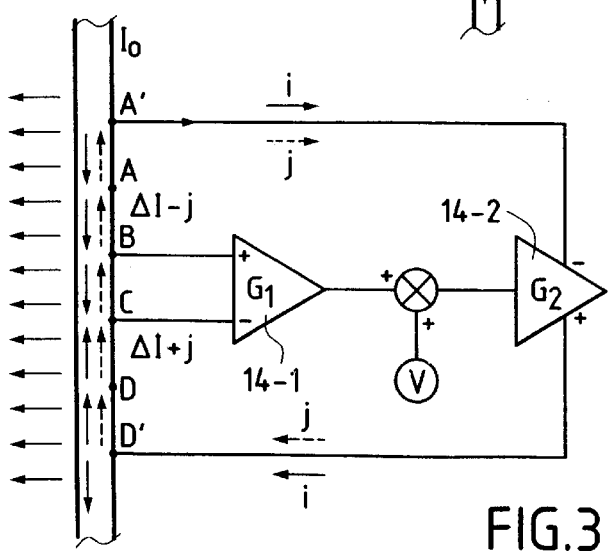
FIG. 3 is a diagram illustrating a second implementation of the invention.

A third solution can be envisaged for determining the resistance $R_{AB}$ or $R_{CD}$ simultaneously with the main operation. This solution is implemented by means of the circuit shown diagrammatically in FIG. 3.

The principle consists in measuring the resistance $R_{AB}$ or $R_{CD}$ with current at a frequency f that is different from the frequency $f_0$ used for the main measurement. The feedback loop shown in FIG. 3 has two amplifiers 14-1 and 14-2 of respective gains $G_1$ and $G_2$. A voltage v is applied between the amplifiers 14-1 and 14-2. This causes a current j to pass round the loop and along the casing, as represented by dashed lines. Given the dimensions of the circuit traveled by this current j, it circulates essentially in the thickness of the casing and it does not depend on the resistivity of the formation. By measuring the current j, it is possible to determine the resistance of the casing using the following equation:

$$R_{AB} = v/G_1 \cdot j \quad [4]$$

The voltage $V_{AB}$ (or $V_{CD}$) is obtained as described with reference to FIG. 2 by means of an amplifier (not shown in FIG. 3) whose inputs are connected to the electrodes a and b (or c and d).

It is mentioned above that the voltage $V_{AB}$ or the voltage $V_{CD}$ is measured. In practice, it is advantageous to measure both of these voltages simultaneously since that makes it possible in a single stage to obtain two measurements corresponding to two different levels in the borehole, one for level B, the other for level C.

Figure 4:
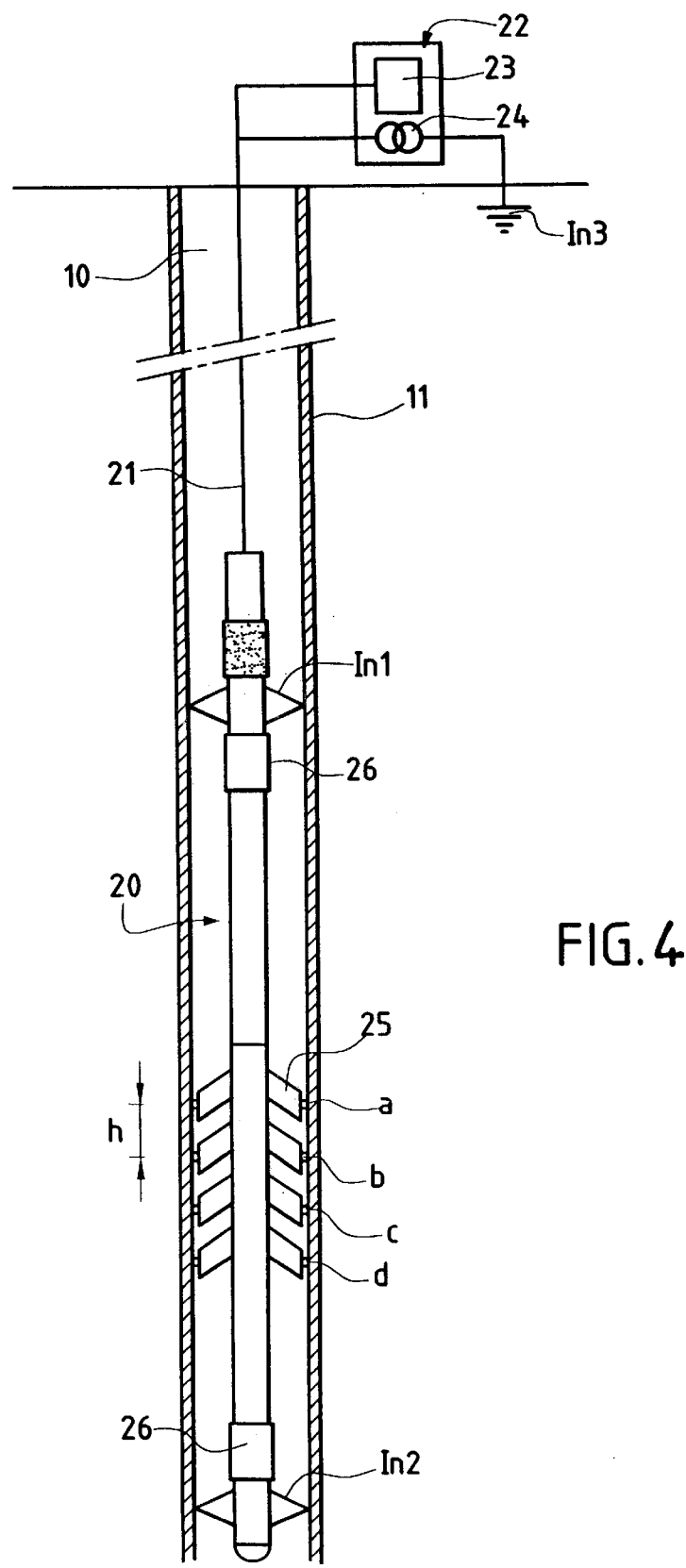
FIG. 4 shows downhole apparatus adapted to perform the invention.

Suitable apparatus for performing the invention is shown diagrammatically in FIG. 4. FIG. 4 shows an oil borehole 10 fitted with casing 11, and a sonde given overall reference 20, which sonde is suspended at the end of an electric cable 21 so that it can be moved along the borehole in the manner which is conventional in oil logging techniques. The cable 21 is connected to surface equipment 22 conventionally comprising a winch (not shown), a data acquisition and processing unit 23, and an electrical power source 24. The sonde 20 has four measurement electrodes a, b, c, and d which can be put into contact with the casing to define sections of casing ab, bc, and cd each of a length suitably chosen to lie in the range 40 cm to 80 cm. In the embodiment shown, the electrodes a, b, c, and d are mounted on respective arms 25 hinged to the sonde 20. Mechanisms of conventional type that need not be described herein are used to spread the arms out from the sonde so as to put the electrodes into contact with the casing, and then to bring them back into the retracted position once measurements have been completed. The electrodes are designed so that once they come into contact with the casing, their positions are fixed as firmly as possibly, and so that electrical contact with the casing is good.

A sonde of this type can be made based on the apparatus used commercially by Schlumberger for the CPET service, as described in U.S. Pat. No. 5,563,514. That apparatus which is designed to evaluate the cathodic protection of casing and its state of corrosion has well measurement electrodes distributed around four levels that are spaced apart in the longitudinal direction, with the distance between levels being about 60 cm, and with the three electrodes in each level being disposed symmetrically about the axis of the apparatus, i.e. with angular intervals of 120° between adjacent electrodes. Nevertheless, for the needs of the present invention, one electrode per level is sufficient.

The sonde also has current electrodes disposed beyond electrodes a and d, i.e. a top electrode In1 and a bottom electrode In2, with these electrodes being at distances from the electrodes a and d which can be of the same order as or slightly greater than the distance between the electrodes a and d, e.g. a few meters. Insulating couplings 26, such as type AH169 couplings, normally used by Schlumberger, are placed at either end of the central portion of the sonde carrying the measurement electrodes a to d so as to isolate them from the current electrodes In1 and In2. The current electrodes In1 and In2 can be made in the manner conventional for centralizers for use in cased wells. The wheels normally provided on such centralizers for making contact with the casing are then replaced by elements suitable for acting as current electrodes, and electrical conductors are provided to connect to the electrode-forming elements.

The sonde also has an electronics subassembly (not shown). This subassembly suitably comprises the amplifiers 12, 13, and 14-1, 14-2 described with reference to FIGS. 2 and 3. The output signals from these circuits are preferably digitized and transmitted to the surface for processing in the unit 23 to determine the resistivity of the formation.

The apparatus also has a remote return electrode In3, preferably placed on the surface at the well head (if the well is deep enough) or at a distance from the well head, and it also has means for feeding electricity to the electrodes. These means comprise the above-mentioned surface source 16 and, where appropriate, an additional source placed within the sonde, together with appropriate switching circuits.

The above-described means make it possible to determine the leakage current Ifor. To determine the resistivity of the formation Rt, it remains to determine the potential of the casing relative to a reference at infinity $V_{B,\infty}$, as described above. Although not subject matter of the present invention, indications are given below on how to determine the potential of the casing.

The usual method consists in using a reference electrode placed on the surface at a distance from the surface return electrode In3. The potential difference VbS is thus measured between the casing at the level B of the measurement electrode b and the reference electrode. Using above equation [1], the ratio $K \cdot V_{bs}/$Ifor is formed, where K is the above-mentioned constant, in order to deduce the resistivity of the formation Rt.

Another method which avoids the use of a reference electrode, is described in french patent application 99/05341 of Apr. 28, 1999, to which reference can be made for a more detailed explanation.

What is claimed is:

1. A method of studying the resistivity of a geological formation around a borehole fitted with metal casing, the method being characterized by the fact that an electric current is applied to the casing so as to cause current to leak into the formation at a given level, said current is shunted by a feedback circuit in contact with the casing on either side of a measurement level, said feedback circuit being organized so that the current flowing along the casing at said level is less compared with the shunt current, the difference between the voltage drops on adjacent sections of casing situated on either side of the measurement level is determined, and the leakage current (Ifor) is deduced therefrom.

2. A method according to claim 1, in which the ratio of the current flowing along the casing at said level and the shunt current is no more than about $10^{-2}$.

3. A method according to claim 1 or 2, in which the voltage drop ($V_{AB}$, $V_{BC}$, $V_{CD}$) over at least one section of casing including said level is measured, the resistance ($R_{AB}$, $R_{BC}$, $R_{CD}$) of said section is determined, and the leakage current is deduced therefrom.

4. A method according to claim 3, in which the resistance of said section of casing is determined from nominal data concerning the casing at the level under consideration.

5. A method according to claim 3, in which the resistance of said section of casing is determined by a measurement stage in which an electric current is applied to the casing so as to give rise to substantially no leakage into the formation.

6. A method according to claim 3, in which the resistance of said section of casing is determined during the same stage as the voltage drop is measured, by measuring at a different frequency.

7. Apparatus for studying the resistivity of a geological formation around a borehole fitted with metal casing, the apparatus being characterized by the fact that it comprises means (24, In3) for applying an electric current to the casing so as to cause current to leak into the formation at a given level, a feedback circuit (12) organized to be in contact with the casing at points (A', D') situated on either side of said level and for maintaining the current flowing along the casing at said level at a value that is less compared with the current shunted via the feedback circuit, and means (13) for measuring the voltage drop that results from said leakage.

8. Apparatus according to claim 7, in which the feedback circuit comprises an amplifier (12) of high gain (G) whose inputs (E1, E2) are in contact with the casing and define thereon a section (BC) adjacent to said measurement section, and whose outputs (S1, S2) are connected respectively to said contact points.

9. Apparatus according to claim 8, comprising means for applying a voltage (v) to said adjacent section (BC) of casing, said voltage being at a frequency different from that of the current applied for creating a leak into the formation, the resulting current (j) being indicative of the resistance of said section of casing.

* * * * *